US007669771B2

(12) United States Patent
Puttaswamy

(10) Patent No.: US 7,669,771 B2
(45) Date of Patent: Mar. 2, 2010

(54) SYSTEM AND METHOD FOR EMBEDDING A PRINTER AND A CARD SWIPE IN A HAND HELD DEVICE

(75) Inventor: Kumar Bhadravathi Puttaswamy, Bangalore (IN)

(73) Assignee: Symbol Technologies, Inc., Holtsville, NY (US)

(*) Notice: Subject to any disclaimer, the term of this patent is extended or adjusted under 35 U.S.C. 154(b) by 940 days.

(21) Appl. No.: 11/416,759

(22) Filed: May 3, 2006

(65) Prior Publication Data

US 2007/0258105 A1 Nov. 8, 2007

(51) Int. Cl.
*G06K 7/10* (2006.01)

(52) U.S. Cl. ............................. 235/472.01; 235/462.45

(58) Field of Classification Search ............ 235/462.45, 235/462.46, 472.01, 472.02, 472.03
See application file for complete search history.

(56) References Cited

U.S. PATENT DOCUMENTS 5,610,387 A * 3/1997 Bard et al. ............. 235/462.44

* cited by examiner

*Primary Examiner*—Karl D. Frech

(57) ABSTRACT

Described is a handheld device for performing a transaction. The device includes a first receiving means for receiving first information via a first input device, the input device being one of an optical reader module, a card swipe module, a touch-sensitive screen, and a key pad. The device further includes a first processing means for processing the first information with a processor and a first generating means for generating a first output via a printer. The device also includes a second receiving means for receiving second information via a second input device, the second input device being one of the optical reader module, the touch-sensitive screen, the card swipe module, and the key pad, a second processing means for processing the second information with the processor and a second generating means for generating a second output via one of the printer and a display module.

22 Claims, 2 Drawing Sheets

SYSTEM AND METHOD FOR EMBEDDING A PRINTER AND A CARD SWIPE IN A HAND HELD DEVICE

BACKGROUND INFORMATION

The present invention relates to a hand held optical reading device, a printer for the hand held device, and a card swipe reader for the hand held device. Hand held devices are generally portable and have a display module and a keypad that allow for either manually actuating buttons on the keypad or touch screen keys on the display module. The keypad or touch screen may be used by an operator for inputting data within the device, and the optical reader of the device may read bar code symbols and other forms of data in order to collect data within the device.

Given the current technology, a commercial transaction would require for a retail salesperson and a customer to be located at a check-out counter in order for a bill the be generated, a receipt to be printed, and payment to be accepted. By embedding a hand held optical reading device with a printer and card swipe reader, a retail salesperson may be provided with the portable ability to generate a bill, print a receipt, and accept payment for the commercial transaction at any location within the business site. In addition, the customer may be allowed to remain in one location throughout the entire commercial transaction process.

SUMMARY OF THE INVENTION

The present invention relates to a handheld device including a housing, a printer arranged in the housing, an optical reader module arranged in the housing for reading information, a light transmitting window in the housing allowing light to pass to the optical reader module, a card swipe module arranged in the housing for receiving information, a keypad, and a display module. The handheld device further includes a processor within the housing for processing information received via the optical reader module, the card swipe module, and the keypad and for directing information onto the display module and to the printer.

A handheld device for performing a transaction. The device includes a first receiving means for receiving first information via a first input device, the input device being one of an optical reader module, a card swipe module, a touch-sensitive screen, and a key pad. The device further includes a first processing means for processing the first information with a processor and a first generating means for generating a first output via a printer. The device also includes a second receiving means for receiving second information via a second input device, the second input device being one of the optical reader module, the touch-sensitive screen, the card swipe module, and the key pad, a second processing means for processing the second information with the processor and a second generating means for generating a second output via one of the printer and a display module.

A method of performing a transaction using a handheld device. The method including receiving first information via a first input device, the input device being one of an optical reader module, a card swipe module, a touch-sensitive screen, and a key pad. Then, processing the first information with a processor and generating a first output via a printer. The method continues to receive second information via a second input device, the second input device being one of the optical reader module, the touch-sensitive screen, the card swipe module, and the key pad, process the second information with the processor and generate a second output via one of the printer and a display module.

DETAILED DESCRIPTION

Figure 1:
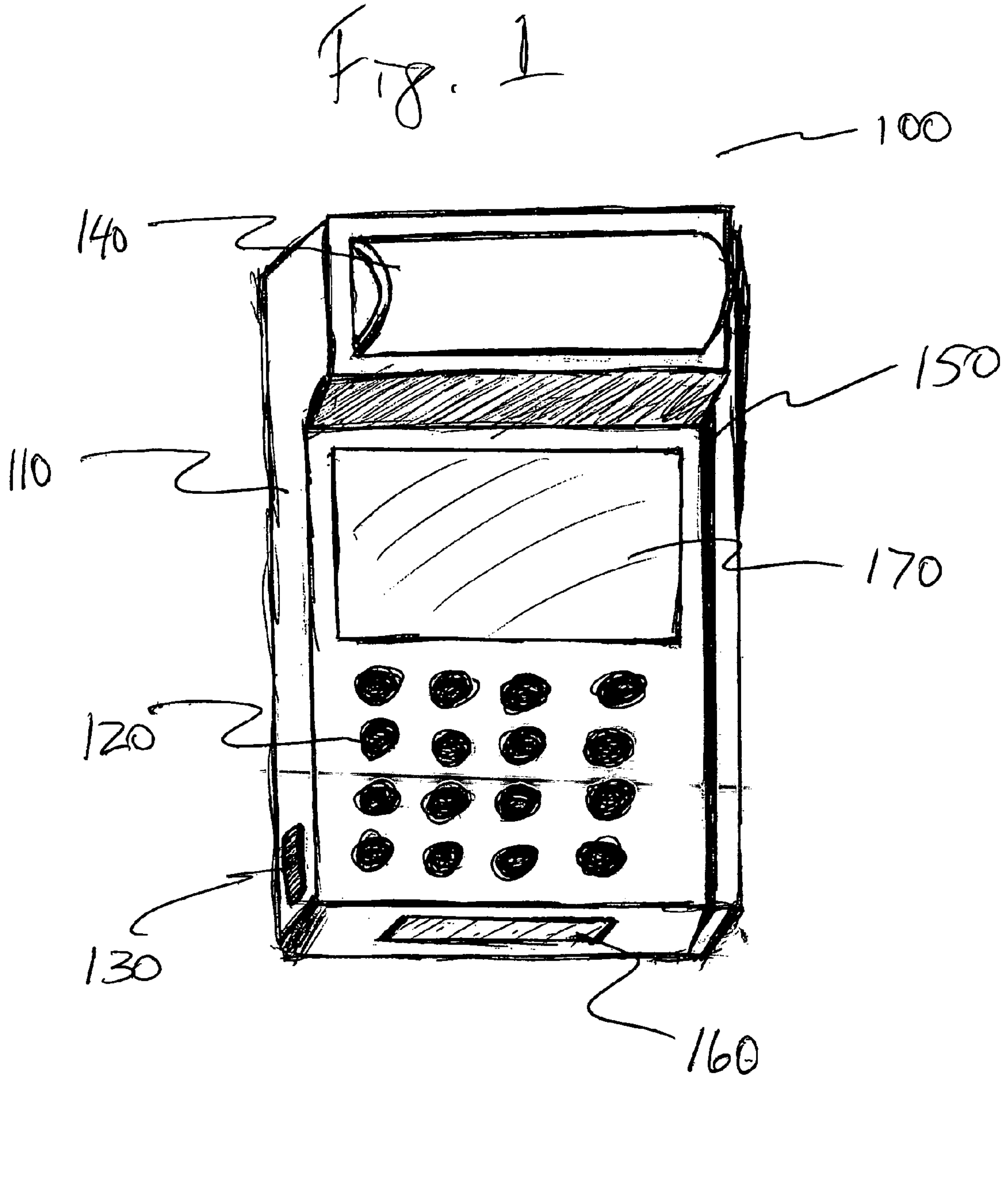
FIG. 1 is an exemplary embodiment of a hand held optical reading device with a printer and a card swipe reader embedded in the device according to the present invention.

The present invention may be further understood with reference to the following description and the appended drawings, wherein like elements are provided with the same reference numerals. The present invention provides a system and a method for embedding a mobile scanning device with a thermal printer and a credit card swipe reader. Although the present invention will be described with respect to a thermal printer, those of skill in the art will understand that the present invention may include an inkjet printer, a bubblejet printer, an impact printer, a price tag printer (e.g., pricing gun), or similar printers which can be constructed to be embedded on a hand held device.

FIG. 1 illustrates an exemplary embodiment of a system according to the present invention. In particular, FIG. 1 shows a device 100 that includes an electronic housing 110, a thermal printer 140, a card swipe module 150, an optical reader module 160, and a display module 170. The electrical housing 110 may be fabricated from an elastomeric resilient material, such as polycarbonate or ABS (acrylonitrile butadiene styrene), to protect the electronic equipment from shock. The housing 110 may include a keypad 120 for performing operator-selected functions and a trigger 130 for initiating the functions of the optical reader module. In addition, an indicator lamp, such as a multicolored LED, may be provided to indicate to the operator that a symbol has been successfully read by the optical reader module.

While a thermal printer 140 according to the present invention may be used in an exemplary embodiment, it is understood that any type of printer may be used as long as it may be configured in the desired form factor. The thermal printer 140 includes a mounting support which has a connector for effecting both an electrical and a mechanical connection to a hand held terminal. The thermal printer 140 may comprise a motor which drives a gear which in turn engages with a set of rollers. Mounted above the motor is a thermal print head. A specially treated thermal paper sheet may be fed between the rollers which, when driven by the motor, effect movement of the sheet under the print head and effect printing thereon.

Data collection for the device 100 may be carried out collectively by entering information in the hand-held computer via a keypad 120, by incorporating an optical reader module 160 for example for reading bar code symbols, and by incorporating a card swipe module 150 for reading a magnetic card stripe. For example when information about various products is required during inventorying, those products may bear bar code symbols or magnetic strips, or have associated magnetic strip cards which are read by the hand-held device 100. The data collected can be transferred from the hand-held device 100 to a central or peripheral device by known means such as radio frequency radio links, wired connections, infra-red communications or other known transmission arrangements. Furthermore, the hand held device 100 may contain a modem (not shown) that may allow for wireless access to the Internet or a LAN (local area network).

The optical reader module 160 is mounted at the end of the electronic housing 110, wherein the optical reader module 160 may be an optical bar code scanner. The components and construction of the optical reader module will be generally well known to the skilled man and are described only briefly hereafter for the purposes of completeness. The optical reader module 160 includes a light source, for example, a laser or LED and a reflector. A reading beam generated by the light source is reflected by the reflector out of a reading window. The reading beam is reflected by a bar code symbol, passes once more through the reading window and is received by a detector. Preferably the optical reader module 160 is a field of view reader in which case the mirror is a fixed mirror and the detector comprises a CCD (charge coupled device) array. Of course in certain implementations a optical reader module 160 may be used in which case reflector is driven by a motor for scanning motion. The light source, detector and, if appropriate, motor are connected to a processor, control and data storage element in conjunction with a power source. The processor element controls operation of the various components and also acts as a data storage and processing device for bar code information read by the optical reader module 160.

The device 100 may be capable of accepting symbols that utilize one-dimensional bar code symbols (as known in the art), as well as two-dimensional bar code symbols, such as RDF417 bar code symbols. Two-dimensional bar code symbol is a stacked bar code symbol, consisting of codewords, or distinct rows and columns of such one dimensional bar code symbols. In general, two-dimensional symbols can reduce the height of traditional one-dimensional symbols and allows for a large amount of data to be encoded in a single symbol (a single PDF417 symbol may carry up to 1.1 kilobytes of machine readable data in a space no larger than a standard one-dimensional bar code symbol). In addition, unlike traditional one-dimensional bar code symbols that represent a pointer or address to a database, a two-dimensional symbol may be the database, itself.

The decode module (not shown) processes the digitized signal generated by the optical reader module 160, and may calculate the desired data, e.g. the multiple digit representation or code of the bar code symbol in accordance with an algorithm contained in a software program. The decode module may include a PROM for holding the control program, a RAM for temporary data storage, and a microprocessor which controls the PROM and RAM and does the desired calculations. The decode module may also include control circuitry for controlling the actuatable components of the device 100. In addition, the decode module may include two-way communications circuitry for communicating with the device 100 and with a host computer, where the host computer is essentially a large database providing information for the decoded symbol. For example, the host computer can provide retail price information corresponding to the decoded symbol.

The device 100 may also include a manually-actuatable trigger 130 that may be mounted onto the electrical housing 110. Depression of the trigger 130 may be operative to turn the microprocessor in the decode module on, thereby initiating the optical reader module 160. Upon release of the trigger, a spring may restore the trigger to its initial position, and the microprocessor may be turned off. In addition, the microprocessor is electrically connected to the actuatable components in the device 100 to actuate and deactuate the actuatable components when the microprocessor is respectively turned on or off by the trigger 130.

Another further piece of equipment that may be used in place of or in conjunction with a mobile device is a portable multi-technology card swipe reader 150. Currently, there are several different types of cards that require scanning or reading in order to access data or authenticate the card. These include credit cards, driver's licenses, military identifications, etc. Currently, the most popular type of card/scanning method is the card swipe module. In these systems, the card is swiped through a machine which reads information off a magnetic stripe on the card. This information, however, may be encoded in many different ways. A card swipe module 150 may comprise a slot that may slidably receive a card including either a bar code symbol or a magnetic strip. Upon insertion of the card into the card swipe module 150, a card sensor which communicates with the device 100 may be used to activate the device 100. In addition, the card swipe module 150 may be bi-directional and also may be located either in a vertical relation to the display module 170 or in a horizontal relation to the display module 170.

Additionally, there are several new types of cards emerging in the marketplace, including smart card and biometrics cards. Therefore, in another embodiment of the present invention the device 100 is a portable, multi-technology card reader capable of scanning any type of card. A host computer may then be configured to read specific types of cards and encoding schemes, such as PDF417 for cards and documents, magnetic stripe cards, smart cards, and even fingerprints. This allows for easy upgradeability when a new card technology or new encoding system is designed. The portable nature of the reader also permits more uses than previous card readers. For example, instead of a waiter taking a credit card from a customer of a restaurant or the customer walking to a counter to pay for the bill, the waiter may generate a bill, print out a receipt, and accept credit card (or debit card) payment right at the customer's table.

In a further example, instead of a police officer taking a driver's license off a detained motorist and swiping it through a machine in his patrol car, he may instead simply scan the card using his portable scanner right at the motorist's car and may print out a traffic violation (i.e., summons and complaint) or a traffic warning. In a further scenario, the device may also include a camera so that the police officer can take a picture of, for example, a vehicle accident scene, a suspect in a crime, etc. The picture may then be uploaded to a central server to be used at that time (e.g., to do a face recognition search on the suspect) or at a later time (e.g., at a court hearing). Furthermore, the device may also include voice communication capability (e.g., mobile phone (GSM, CDMA, etc.) VoIP phone, 802.11 voice communications, etc) so that the user may communicate via voice.

As described above, the device may include a keypad 120 and display module 170. The keypad 120 may comprise a plurality of manually-depressible keys, each for a different numeral, and a set of function keys to calculate and display various functions required in a given application. In addition, the keypad 120 may serve as a means for accepting secured PIN (personal identification number) information, where the PIN information may related to debit card of a customer. The display module 170 may be of a backlit, multi-lined, low-power LCD (liquid crystal display) type. The mounting the keypad 120 and the display module 170 to the electrical housing 110 may facilitate data entry and data reading at the location of the device 100, as opposed to a more remote location away from the device 100.

In an alternate embodiment, the display module 170 may be an interactive touch screen (not shown) and may supplement the use of the keypad 120. The touch screen may display information and system status, and allow the operator to select various functions and operating modes of the device. Manual key activation could be provided by a touch screen having software defined operator interface buttons. The touch screen may include different software menus and different software controlled buttons or graphic control representations to provide operator input commands. Alternatively, a thumbwheel (not shown) could be provided to scroll through various options and select a desired command or field. The thumbwheel would have a rotating function for scrolling in one of two directions and also be capable of being depressed to select a specific command once it is selected.

In a further embodiment of the invention, the display screen 170, when implemented as a touch-sensitive screen, can be configured to combine analog and digital operation. In one aspect of this embodiment, a portion of the touch-sensitive display screen can be dedicated to a digital process, such as turning the screen ON or OFF, while the remaining portion of the screen can be dedicated to an analog process such as recording all the information that is pressed onto the screen (e.g., recording a signature executed onto the screen using a stylus or other writing device). Thus, the analog portion of the touch screen may operate as an electronic signature capture module for the verification and authentication of handwritten signatures.

The device 100 may also include a speaker (not shown) and a microphone (not shown) to provide audio operator feedback. The microphone may convert acoustical voice signals into electric signals and may be utilized for receiving voice commands sent to the device. The speaker may convert electrical signals into acoustical signals that may be audible to the operator. The signals may be used to report the system status of the device via recorded messages, beeps, or music audible to the operator.

Figure 2:
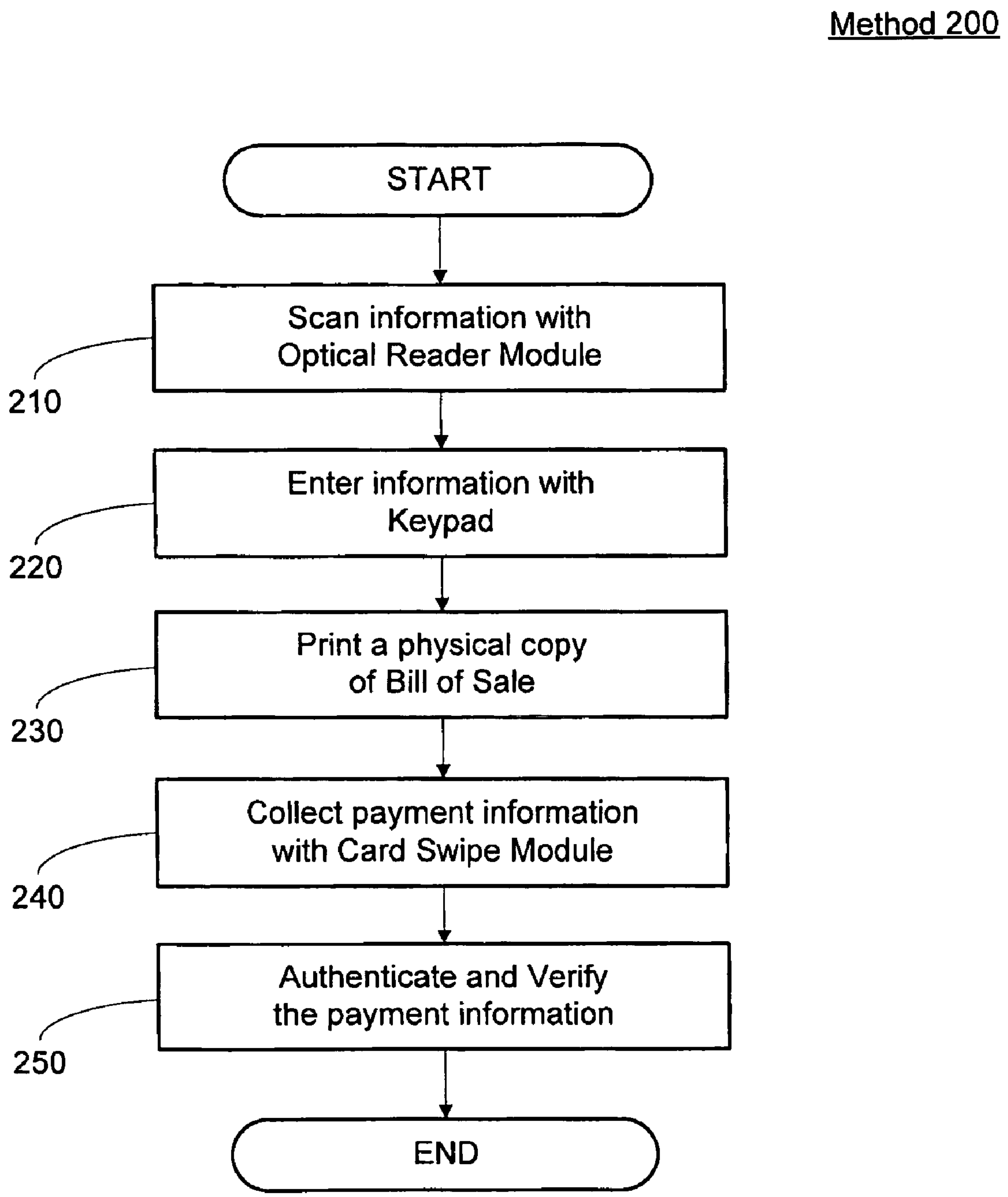
FIG. 2 is an exemplary embodiment of a method according to the present invention.

FIG. 2 shows a flow chart describing a method 200 according to the exemplary embodiment of the present invention for competing a commercial transaction. The method will be described to provide an operator with the portable ability of generating a bill or receipt, printing the bill or receipt, and accepting payment for the transaction at a single location. The operators of the device 100 may include a salesperson at a retail store, a waiter at a restaurant, and even a police officer during a traffic stop.

In step 210, the operator of the device 100 may collect information via the optical reader module 160. The function of the optical reader module 160 may be initiated by depressing a trigger 130. As described above, the optical reader module 160 may be a bar code scanner capable of collecting information relating to various bar codes and symbols. Thus, during step 100, the operator may depress the trigger 130 to optically scan a bar code associated with a product of a commercial transaction. The optical scan may allow the device 100 to collect information pertaining to that product. In addition, the optical scan may be used to collect information contained on an item presented to the operator, such as a coupon or a driver's license.

In step 220, the operator of the device 100 may collect further information via the keypad 120. The keypad 120 may be used to collect any information relating to the commercial transaction that is not in a scannable, bar code format. In addition, the keypad 120 may also be used by the operator to edit or remove an information that was first collected by the optical reader module 160. The information obtained from both the optical reader module 160 and the keypad 120 may be used by the device 100 to generate a record or bill of the commercial transaction.

In step 230, the operator of the device 100 may use a thermal printer 140 to print out a physical record or bill pertaining to the commercial transaction. The print out may include multiple copies of the record such as an operator copy (or merchant copy) and a customer copy. Thus, the thermal printer 140 may provide the operator with the portable ability to present a customer with a physical bill at any location within the commercial site, including the point of sale. In one embodiment of the present invention, the thermal printer 140 may generate a price tag. According to this embodiment, an operator of the present invention may scan the bar code of an item for sale, print a price tag for a customer, and accept immediate payment for the item from the customer.

In step 240, the operator of the device 100 may collect further information via a card swipe module 150, where this information may include payment information from a customer. As described above, the card swipe module 150 may be a magnetic stripe card reader capable of reading information from a credit card, a debit card, a driver's license, or any other card that may store information on a magnetic stripe. Thus, the card swipe module 150 may provide the operator with the portable ability to accept payment from a customer during a transaction at any location within the commercial site, including the point of sale.

Finally, in step 250, the operator of the device 100 may collect payment authorization and verification information from a customer. The authorization and verification information for a credit card payment may be collected via a signature capture module within the display module 170 of the device 100. Alternatively, the authorization and verification information for a debit card payment may be collect via a PIN entered by the customer on the keypad 120. Thus, the authorization and verification of the payment may be accomplished by a customer to finalize the transaction at any location within the commercial site, including the point of sale.

Those of skill in the art will understand that the above described process is only exemplary and that steps may be added or deleted from the process or alternative steps may be used to accomplish the same function. For example, in one exemplary alternative embodiment, the operator of the device 100 utilize the optical reader module 160 to generate and store within the device 100 an inventory list of the products located at the commercial site. Thus, the operator (or salesperson) may manually select the specific product via the keypad 120 (or touch screen) at a later time when the product is sold to a customer. This embodiment would allow for a commercial transaction to be accomplished between a salesperson and a customer without the purchased product being located contemporaneously at the point of sale.

The present invention has been described with the reference to the above exemplary embodiments. One of skilled in the art would understand that the present invention may also be successfully implemented if modified. Accordingly, various modifications and changes may be made to the embodiments without departing from the broadest spirit and scope of the present invention as set forth in the claims that follow. The specification and drawings, accordingly, should be regarded in an illustrative rather than restrictive sense.

What is claimed is:

1. A handheld device, comprising:

a housing;

a printer arranged in the housing;

an optical reader module arranged in the housing for reading information;

a light transmitting window in the housing allowing light to pass to the optical reader module;

a card swipe module arranged in the housing for receiving information;

a keypad;

a display module configured to combine analog input information and digital input information for processing by the processor; and a processor within the housing for processing information received via the optical reader module, the card swipe module, and the keypad and for directing information onto the display module and to the printer.

2. The handheld device according to claim 1, wherein the optical reader module is a bar code scanner.

3. The handheld device according to claim 1, wherein the card swipe module is a bi-directional magnetic stripe card reader.

4. The handheld device according to claim 1, wherein the display is a touch-sensitive screen.

5. The handheld device according to claim 1, wherein the printer includes one of a thermal print head, an ink jet print head, a bubble jet print head, and an impact printer print head.

6. The handheld device according to claim 1, wherein the printer is configured to print adhesive pricing tags for an item of sale.

7. The handheld device according to claim 1 further comprising a transceiver for wireless access to a network.

8. The handheld device according to claim 7, wherein the network is one of a LAN, a WLAN, and a WWAN.

9. The handheld device according to claim 1 further comprising a manually actuated trigger for selectively operating the optical reader module.

10. The handheld device according to claim 1, further comprising a camera.

11. The handheld device according to claim 1, further comprising a means to communicate via voice.

12. A method of performing a transaction using a handheld device, comprising:

receiving first information via a first input device, the input device being one of an optical reader module, a card swipe module, a touch-sensitive screen, and a key pad;

processing the first information with a processor;

generating a first output via a printer;

receiving second information via a second input device, the second input device being one of the optical reader module, the touch-sensitive screen, the card swipe module, and the key pad;

processing the second information with the processor;

generating a second output via one of the printer and a display module, the display module configured to combine analog input information and digital input information for processing by the processor.

13. The method according to claim 12 further comprising authenticating the first information received by the first input device.

14. The method according to claim 12 further comprising authenticating the second information received by the second input device.

15. The method according to claim 14, wherein the authenticating includes:

transmitting the second information to a third party processing center via a transceiver of the handheld device; and receiving authentication information from the third party processing center.

16. The method according to claim 12, wherein the card swipe module is a bi-directional magnetic stripe card reader.

17. The method according to claim 12, wherein the printer includes one of a thermal print head, an ink jet print head, a bubble jet print head, and an impact printer print head.

18. The method according to claim 12, wherein the first output is a bill for one of goods and services being purchased.

19. The method according to claim 12, wherein the second output is a receipt for one of goods and services being purchased.

20. The method according to claim 12, wherein the optical reader module is a bar code scanner.

21. The method according to claim 12, wherein the second information is one of credit card information and debit card information.

22. A handheld device of performing a transaction, comprising:

a first receiving means for receiving first information via a first input device, the input device being one of an optical reader module, a card swipe module, a touch-sensitive screen, and a key pad;

a first processing means for processing the first information with a processor;

a first generating means for generating a first output via a printer;

a second receiving means for receiving second information via a second input device, the second input device being one of the optical reader module, the touch-sensitive screen, the card swipe module, and the key pad;

a second processing means for processing the second information with the processor; and a second generating means for generating a second output via one of the printer and a display module, the display module configured to combine analog input information and digital input information for processing my the processor.

* * * * *

UNITED STATES PATENT AND TRADEMARK OFFICE
CERTIFICATE OF CORRECTION

PATENT NO. : 7,669,771 B2
APPLICATION NO. : 11/416759
DATED : March 2, 2010
INVENTOR(S) : Puttaswamy It is certified that error appears in the above-identified patent and that said Letters Patent is hereby corrected as shown below:

IN THE SPECIFICATION

In Column 1, Line 20, delete "the be" and insert -- be --, therefor.

IN THE CLAIMS

In Column 8, Line 48, in Claim 22, delete "my" and insert -- by --, therefor.

Signed and Sealed this
Fifth Day of June, 2012

David J. Kappos
*Director of the United States Patent and Trademark Office*